United States Patent

Snawerdt, III et al.

[11] Patent Number: 5,805,317
[45] Date of Patent: Sep. 8, 1998

[54] ACOUSTO-OPTIC CHANNELIZER-BASED ULTRA-WIDEBAND SIGNAL PROCESSOR

[75] Inventors: Peter F. Snawerdt, III, Melbourne Beach; Mark D. Koontz, Melbourne; Randall K. Morse; Norman C. Hollingsworth, both of Palm Bay, all of Fla.

[73] Assignee: Harris Corporation, Melbourne, Fla.

[21] Appl. No.: 908,452

[22] Filed: Aug. 7, 1997

[51] Int. Cl.[6] .................................................. H04B 10/06
[52] U.S. Cl. ........................ 359/109; 359/191; 359/305; 364/822
[58] Field of Search .................... 359/189, 190, 359/191, 109, 298, 285, 305, 312, 310, 315; 364/825, 822, 807

[56] References Cited

U.S. PATENT DOCUMENTS

| | | | |
|---|---|---|---|
| 3,936,831 | 2/1976 | Jones | 343/113 |
| 4,328,576 | 5/1982 | Oakley | 359/191 |
| 4,389,093 | 6/1983 | Jackson | 359/298 |
| 4,448,494 | 5/1984 | Freyre | 359/285 |
| 4,460,250 | 7/1984 | Freyre et al. | 359/285 |
| 4,503,388 | 3/1985 | Zehl et al. | 324/77 |
| 5,105,380 | 4/1992 | Owechko | 359/305 |
| 5,315,307 | 5/1994 | Tsui et al. | 342/444 |
| 5,404,144 | 4/1995 | Vlannes | 342/13 |

*Primary Examiner*—Rafael Bacares
*Attorney, Agent, or Firm*—Charles E. Wands

[57] ABSTRACT

An ultra-wideband signal processor, such as that employed for processing narrow time domain radar return pulses, includes a coherent acousto-optic Bragg cell channelizer having a plurality of IF outputs from which a plurality of IF output signals respectively representative of energy content of respectively different frequency portions of the RF input signal are derived. A summing circuit is coupled to sum the IF output signals to produce a summation signal representative of their average energy content. This average energy signal is compared with a threshold to determine if the input signal is a valid RF signal. A delay circuit delays a selected one of the IF output channels by a time sufficient to accommodate summation of the channelizer outputs and determining whether a valid RF signal is present. A digital signal processor processes the delayed selected output signal in response to the summation signal exceeding the threshold.

11 Claims, 3 Drawing Sheets

ACOUSTO-OPTIC CHANNELIZER-BASED ULTRA-WIDEBAND SIGNAL PROCESSOR

FIELD OF THE INVENTION

The present invention relates in general to radar and communication signal processing systems, and is particularly directed to a new and improved ultra-wideband signal processor architecture that includes a coherent acousto-optic channelizer, the inherent phase information preservation and pulse-stretching properties of which allow the use of relatively reduced sampling rate digital processing components, for downstream processing of a delayed version of a selected one of the channelizer's output frequency bins, in response to the summed energy of the channelizer's output channels exceeding a predetermined 'detection' threshold.

BACKGROUND OF THE INVENTION

A fundamental limitation of signal processing systems intended for use in ultra-wideband applications (e.g., those used for processing signals having a frequency of several or more GHz), such as, but not limited to, passive radar direction finding receivers, is the fact that they have no a prior knowledge of the characteristics (e.g., time or direction of arrival) of a monitored signal. Because the signal of interest is typically manifested as a very narrow width time domain pulse, often barely longer than a single cycle of the transmitted carrier with little leading or trailing noise, by the time it is detected, it is gone.

One brute force proposal to solve this problem is to use an extremely fast (ultra high sampling rate) analog-to-digital converter, output data samples from which are buffered for subsequent analysis. Fundamental shortcomings of this approach include the fact that such a digitizer is extremely expensive, and processing of the digitized signal cannot be carried out in real time.

SUMMARY OF THE INVENTION

In accordance with the invention, these drawbacks are effectively overcome by taking advantage of the inherent pulse-stretching properties and phase information preservation properties of a coherent acousto-optic channelizer, so as to allow the use of reduced complexity and low cost digital signal processing components, that perform real time detection of extremely narrow time domain radar return signals, that may be present at the channelizer's input.

For this purpose, the architecture of the ultra-wideband signal processor of the present invention includes an acousto-optic Bragg cell-based channelizing receiver to which an ultra-wideband RF signal of interest, such as radar return signals having a modulation bandwidth on the order of 1–5 GHz, are applied. The RF signal to be analyzed is applied to a 'signal' Bragg cell disposed in a first split beam path of an output beam from a coherent optical beam generator/laser. A reference signal is applied to a 'reference' Bragg cell disposed in a second split beam path from the laser. The two Bragg cell-modulated beams are combined and focussed upon a photodetector array.

Because of the travel time of the acoustic waves through the illumination apertures of a channelizer Bragg cells, the Bragg cell's relatively narrow time domain pulses of the RF input signal is effectively 'stretched' into an output signal having a considerably longer time domain width. This increased time domain width of the photodetector's output signal allows the use of processing components having a sampling rate that is considerably reduced compared with that necessary to directly sample ultra-wideband (GHz bandwidth) signals.

Due to the spatial dependency of the frequency content of the channelizer's combined output beam incident upon the photodetector array, the outputs of successively adjacent sets of respective detectors of the channelizer's photodetector array are subdivided into adjacent IF channels, each having a prescribed frequency range portion of the overall bandwidth of the RF signal being processed. The contents of a respective IF channel are a coherent representation of the RF input signal.

The respective IF frequency bin signals are coupled through a power divider to a set of associated logarithmic video output signal amplifier circuits. In response to receipt of an ultra-wideband RF input signal within the detection band of interest, the signal amplitude outputs of respective amplifier circuits will suddenly increase. However, since no individual IF channel contains a substantial amount of signal energy, the ultra-wideband RF pulse of interest cannot be readily detected by monitoring the energy in only one IF channel. On the other hand, since all of the channels respond simultaneously to the presence of an RF impulse, summing all of the IF channels into a composite signal, will not only allow all of the useful energy in the received signal to be observed, but unwanted noise components will be effectively minimized.

For this purpose, the outputs of the log signal amplifier circuits are coupled to a summation circuit to produce a composite signal energy signal. Alternatively, the summation signal may comprise a summation of less than the signal energy contained in all of the IF channels, for example, in a case where the signal of interest is located in a only prescribed portion of the spectrum processed by the channelizer.

The composite IF signal is divided by the number of channels being summed, to produce a signal representative of the average amplitude response across the RF bandwidth being processed. This averaged signal is then digitized and applied to a digital signal processor, wherein it is compared with a prescribed threshold. If the threshold is exceeded, it is concluded that the summed signal energy represents an RF signal of interest, and an interrupt to the processor is generated.

In order to provide opportunity for the processor to analyze a detected RF signal, the signal output of a selected channelizer IF output channel is coupled through a delay circuit, which imparts a delay to the selected IF channel/bin signal that is sufficient to accommodate the inherent signal processing delay through the channel-averaging components described above. This delayed IF channel signal is then digitized and analyzed by the digital signal processor, in response to the detection-based interrupt. Since all phase information in the RF signal is preserved, the channelizer processor is not only able to detect ultra wideband RF signals, but may be used with one or more other Bragg cell channelizer-based receivers to locate the direction of incidence (angle of arrival) of the RF signal.

DETAILED DESCRIPTION

Figure 1:
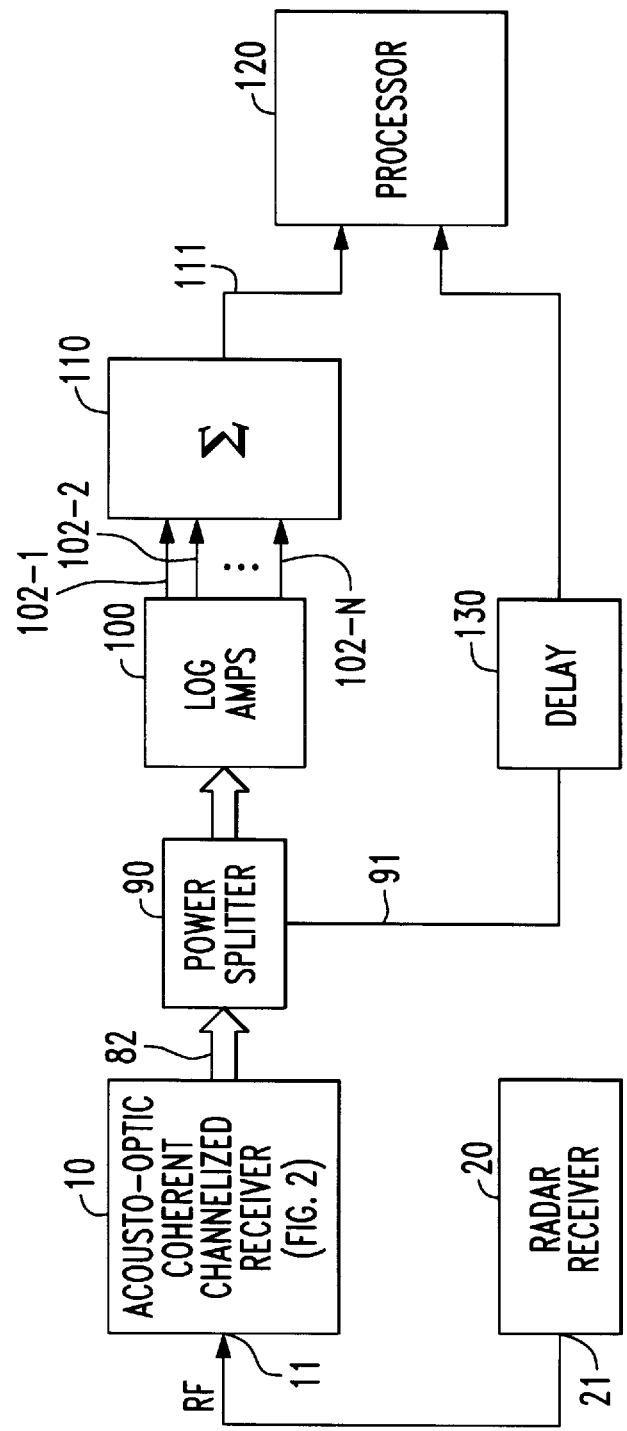
FIG. 1 diagrammatically illustrates the architecture of a ultra-wideband signal processor in accordance with the present invention.

Before describing in detail the acousto-optic channelizer-based ultra-wideband signal processor of the present invention, it should be observed that the invention resides primarily in what is effectively a prescribed arrangement of conventional communication circuits and associated electro-optic and digital signal processing components. Consequently, the configuration of such circuits and components and the manner in which they are interfaced with other elements of a communication system, such as but not limited to a passive radar receiver, have, for the most part, been illustrated in the drawings by readily understandable block diagrams. These block diagrams show only those specific details that are pertinent to the present invention, so as not to obscure the disclosure with details which will be readily apparent to those skilled in the art having the benefit of the description herein. Thus, the block diagram illustration to be described is primarily intended to show the major components of the system in a convenient functional grouping, whereby the present invention may be more readily understood.

Figure 2:
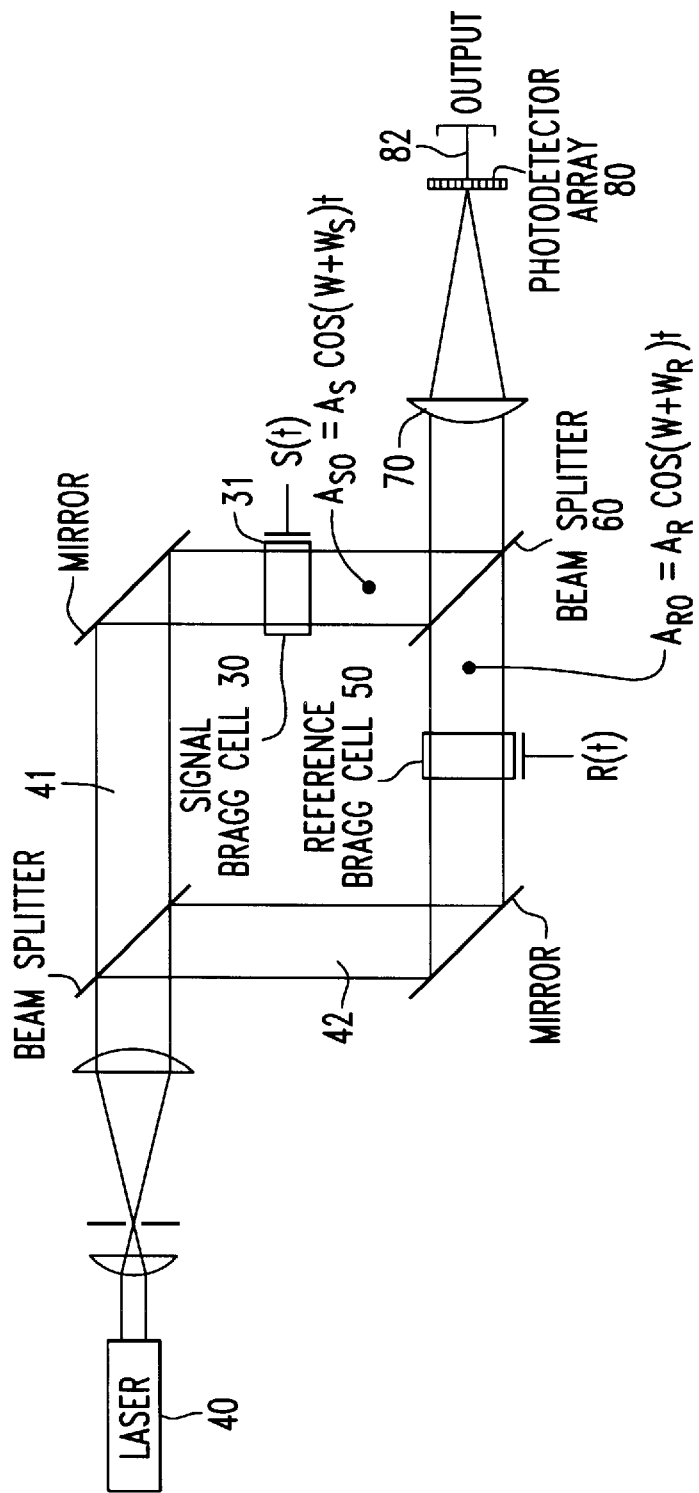
FIG. 2 shows an acousto-optic Bragg cell-based channelizing receiver.

Referring now to FIG. 1, the architecture of the ultra-wideband signal processor of the present invention is diagrammatically illustrated as comprising an acousto-optic coherent channelizing receiver 10, such as an acousto-optic Bragg cell-based channelizing receiver shown in FIG. 2, having an input port 11 to an ultra-wideband signal of interest is coupled. As described above, for purposes of providing a non-limiting application of the present invention, input port 11 may be coupled to receive the analog signal output 21 of a passive radar receiver 20 (including radar antenna and associated low noise amplifier (LNA) units, not shown) that is operative to receive RF signals.

Figure 3:
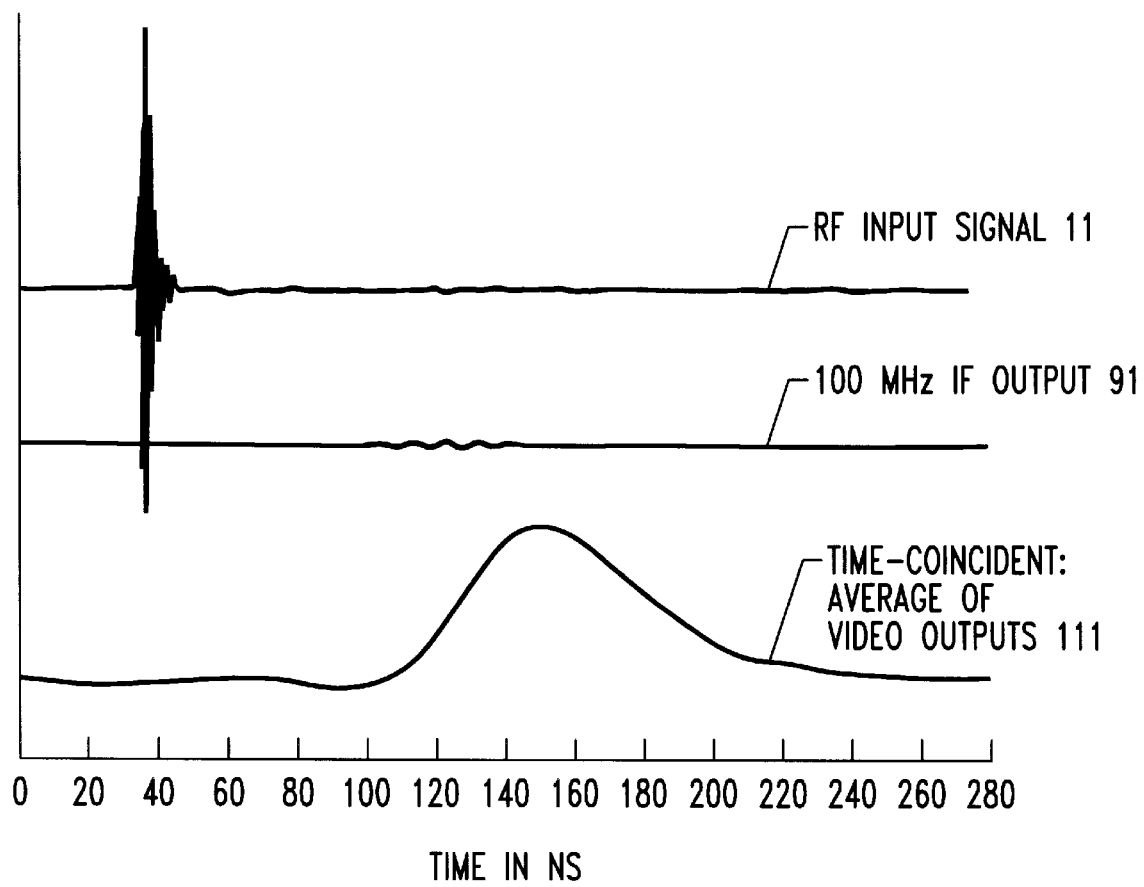
FIG. 3 shows signals of the signal processor of FIG. 1.

As shown in FIG. 2, the RF signal, an example of which is shown in FIG. 3, is applied as an signal S(t) to the electro-acoustic transducer 31 of a 'signal' Bragg cell 30, which is disposed in a first split beam path 41 of an output beam from a coherent optical beam generator (laser) 40. As the RF input signal 21 is applied to the transducer 31 of the channelizer's signal Bragg cell 30, the resulting acoustic wave launched through the cell modulates the width of the first split path optical beam 41 to produce a modulated output $A_{SO}$. A reference signal R(t) is applied to the electro-optic transducer 51 of a 'reference' Bragg cell 50, which is disposed in a second split beam path 42 of the output beam from laser 40. Via a beam splitter-combiner 60, the modulated output $A_{SO}$ of signal Bragg cell 30 is combined with the modulated output $A_{RO}$ of reference Bragg cell 50 and focussed via lens 70 upon a photodetector array 80.

Because of the travel time of the acoustic waves through the channelizer's Bragg cells 30 and 50, and the width or illumination aperture of the beams passing through the cells and intercepted and modulated by the respective signals S(t) and R(t), the Bragg cells possess an inherent time spreading window (e.g., on the order of 37.5 nanoseconds). This window effectively 'stretches' the relatively narrow time domain pulses of the input signals (e.g., on the order of 1–2 ns) into a combined output signal 82 at the output of photodetector array 80, having a considerably longer time domain width on the order of 38.5–39.5 ns. This increased time domain width of the photodetector's output signal 82 allows the use of processing components, having a sampling rate that is considerably reduced compared with that necessary to directly sample ultra-wideband (GHz bandwidth) signals.

Due to the spatial dependency of the frequency content of the channelizer's combined output beam incident upon the photodetector array 80, the outputs of successively adjacent sets of respective detectors of the array 80 are readily subdivisible into bins or channels, each having a prescribed frequency range of or portion of the overall bandwidth of the RF signal being processed. As a non-limiting example, for an RF input signal range of 750 MHz to 1.25 GHz, the (500 MHz wide) output of the channelizer's photodetector array 80 may be subdivided into twenty-five adjacent frequency bins, each having a bandwidth of 20 MHz. The (IF) contents of a respective channel or bin are therefore a coherent representation of the analog RF input signal 21.

The respective IF frequency bin signals produced by the channelizer 10 are coupled through a power divider 90 to a set of associated logarithmic video output signal amplifier circuits 100, representative outputs of which are shown at 102-1, 102-2, . . . 102-N (where N=25 in the present example). In response to receipt of an ultra-wideband RF input signal within the detection band of interest, it can be expected that the signal amplitude outputs of respective ones of the amplifier circuits 100 will suddenly increase. Since no individual channel or bin contains a substantial amount of signal energy, however, such an ultra-wideband pulse cannot be readily detected by observing the energy in only one channel.

On the other hand, since all of the channelizer's output channels respond simultaneously to the presence of an RF impulse, by summing all of the IF channels into a composite signal, not only will all of the useful energy in the received signal be observable, but unwanted noise components will be effectively minimized. To this end, the outputs of a plurality of the log signal amplifier circuits 100 are summed in a summation circuit 110 to produce a composite signal energy signal 111. Although the summation signal may comprise a summation of the signal energy contained in all the channels or bins, less than all of the channels available at the output of the channelizer 10 may be employed to derive the summation signal, for example in a case where the signal of interest is located in a only prescribed portion of the spectrum processed by the channelizer.

By dividing or scaling the composite energy signal by the number of channels being summed, a signal 111 representative of the average amplitude response across the processed bandwidth (500 MHz in the present example) is provided. For this purpose, the ratio of the log amplifiers' feedback and input resistors may be set at 1/N (where N is the number of channels being summed (25 in the present example)). This averaged signal 111 is then digitized and applied to a digital signal processor 120, wherein it is compared with a prescribed threshold. If the threshold is exceeded, it is determined that the summed signal energy represents an RF signal of interest, thereby providing an interrupt to the processor for analyzing the contents of a selected one of the frequency bins.

In order to provide opportunity to analyze a detected RF signal, the signal output 91 of one of the channelizer's output bins (as controllably selected by processor 120) is coupled via a controlled power divider 90 through a delay circuit 130. Although the center IF channel may be used, any of the bins may be selected. Delay circuit 130 imparts a delay to the selected IF channel/bin signal 91 that is sufficient to accommodate the inherent signal processing delay through the channel-averaging components described above. This delayed IF channel signal is then digitized and applied to digital signal processor 120 for analysis. As pointed out above, since Bragg cell channelizer 10 is a coherent signal processor, all phase information in the originally received RF signal is preserved, thereby enabling the channelizer processor of the present invention to not only detect ultra wideband RF signals, but to be used with one or more other such Bragg cell channelizer-based receivers to locate the direction of incidence (angle of arrival) of the RF signal.

As will be appreciated from the foregoing description, the above described drawbacks of conventional wideband signal processors are effectively obviated in accordance with the present invention, by using the inherent pulse-stretching properties and phase information preservation properties of a coherent acousto-optic channelizer, to perform real time detection of extremely narrow time domain radar return signals, that may be present at the channelizer's input.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. A method of processing a wideband signal comprising the steps of:
    (a) coupling said wideband signal to an acousto-optic channelizer having a plurality of outputs from which a plurality of output signals respectively representative of energy content of respectively different frequency portions of said input signal are derived;
    (b) summing at least two of said output signals to produce a summation signal representative of energy content contained in said at least two output signals;
    (c) comparing said summation signal to a threshold;
    (d) delaying a selected one of said output signals; and
    (e) processing said selected one of said output signals in accordance with a prescribed signal processing operation, in response to said summation signal exceeding a predetermined threshold.

2. A method according to claim 1, wherein step (b) comprises summing each of said output signals to produce a summation signal representative of energy content of each of said output signals.

3. A method according to claim 1, wherein said acousto-optic channelizer comprises a coherent Bragg cell channelizer.

4. A method according to claim 1, wherein step (e) comprises digitizing said selected one of said output signals into a digitized output signal and processing said digitized output signal in accordance with said prescribed signal processing operation, in response to said summation signal exceeding said predetermined threshold.

5. A wideband signal processor comprising:
    an acousto-optic channelizer having an input to which a wideband signal is applied and a plurality of outputs from which a plurality of output signals respectively representative of energy content of respectively different frequency portions of said input signal are derived;
    a delay circuit coupled to delay a selected one of said output signals;
    a summing circuit coupled to sum at least two of said output signals to produce a summation signal representative of energy content contained in said at least two output signals; and
    a signal processor which is operative to process said selected one of said output signals in accordance with a prescribed signal processing operation, in response to said summation signal exceeding a predetermined threshold.

6. A wideband signal processor according to claim 5, wherein said summing circuit is coupled to sum each of said output signals and thereby produce a summation signal representative of energy content of each of said output signals.

7. A wideband signal processor according to claim 5, wherein said acousto-optic channelizer comprises a coherent Bragg cell channelizer.

8. A wideband signal processor according to claim 5, wherein said signal processor is operative to digitize said selected one of said output signals into a digitized output signal and to process said digitized output signal in accordance with said prescribed signal processing operation, in response to said summation signal exceeding said predetermined threshold.

9. A wideband signal processor according to claim 5, wherein said wideband signal is a radar return RF signal having a modulation bandwidth lying in a range on the order of 1–5 GHz.

10. A wideband signal processor according to claim 5, wherein respective output channels of said acousto-optic channelizer are coupled through a power divider to associated logarithmic amplifier circuits, outputs of which are coupled to said summing circuit, and wherein said power divider is operative to couple said selected one of said output signals to said delay circuit.

11. A wideband signal processor according to claim 10, wherein summed outputs of said logarithmic amplifier circuits are divided by the number of channels being summed, to produce a signal representative of the average amplitude response across the bandwidth being processed.

* * * * *